(12) United States Patent
Brenner et al.

(10) Patent No.: US 6,584,488 B1
(45) Date of Patent: Jun. 24, 2003

(54) CONTROLLING ALLOCATION OF SYSTEM RESOURCES WITH AN ENHANCED PRIORITY CALCULATION

(75) Inventors: Larry Bert Brenner, Austin, TX (US); Luke Matthew Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,885

(22) Filed: Apr. 12, 1999

(51) Int. Cl.[7] ................................................. G06F 9/00
(52) U.S. Cl. ........................................ 709/103; 709/107
(58) Field of Search .................................. 709/103, 107

(56) References Cited

U.S. PATENT DOCUMENTS 6,091,414 A * 7/2000 Kraft, IV et al. ............ 345/344
6,101,540 A * 8/2000 Graf ............................ 709/224
6,304,906 B1 * 10/2001 Bhatti et al. ................. 709/227
6,338,072 B1 * 1/2002 Durand et al. ............... 707/205

OTHER PUBLICATIONS

Ahmad et al. DPS: dynamic priority scheduling heuristic for heterogenous computing systems pp. 411–418, 1998.*
Calyso Version 1.0 For Linux Manual pp. 1–36, 1998.*
Rochkind Advanced UNIX Programming pp. 9, 120–121, 1985.*
Bach The Design of the Unix Operating System pp. 247–268, p. 207–208, 1990.*

* cited by examiner

Primary Examiner—Larry D Donaghue
(74) Attorney, Agent, or Firm—Volel Emile; Bracewell & Patterson, L.L.P.

(57) ABSTRACT

A method and system for controlling the allocation of a data processing system's resources among two or more components competing for the resources. An internal system value is modified to yield a modified system value. A utilization history is created by mapping a component's utilization of the system resources. Then, the priority of the component is calculated utilizing the utilization history and the modified system value within a priority calculation.

24 Claims, 3 Drawing Sheets

CONTROLLING ALLOCATION OF SYSTEM RESOURCES WITH AN ENHANCED PRIORITY CALCULATION

BACKGROUND OF THE INVENTION

1. Field of the Invention

The present invention relates generally to data processing systems, and in particularly to a method and system for scheduling threads on a data processing system. Still more particularly, the present invention relates to a method and system for scheduling threads on a data processing system wherein system resources are allocated based on a priority determination of a thread.

2. Description of the Related Art

The basic structure of a conventional computer system includes a system bus or a direct channel that connects one or more processors to input/output (I/O) devices (such as a display monitor, keyboard and mouse), a permanent memory device for storing the operating system and user programs (such as a magnetic hard disk), and a temporary memory device that is utilized by the processors to carry out program instructions (such as random access memory or "RAM").

When a user program runs on a computer, the computer's operating system (OS) first loads the program files into system memory. The program files include data objects and instructions for handling the data and other parameters which may be input during program execution.

The operating system creates a process to run a user program. A process is a set of resources, including (but not limited to) values in RAM, process limits, permissions, registers, and at least one execution stream. Such an execution stream is commonly termed a "thread." The utilization of threads in operating systems and user applications is well known in the art. Threads allow multiple execution paths within a single address space (the process context) to run concurrently on a processor. This "multithreading" increases throughput and modularity in multiprocessor and uniprocessor systems alike. For example, if a thread must wait for the occurrence of an external event, then it stops and the computer processor executes another thread of the same or different computer program to optimize processor utilization. Multithreaded programs also can exploit the existence of multiple processors by running the application program in parallel. Parallel execution reduces response time and improves throughput in multiprocessor (MP) systems.

FIG. 1 illustrates multithreading in a uniprocessor computer system 100, which includes a bus 118 that connects one processor 112 to various I/O devices 114 and a memory device 116. Memory device 116 contains a set of thread context fields 120, one for each thread associated with a particular process. Each thread consists of a set of register values and an execution stack 124. The register values are loaded into the CPU registers when the thread executes. The values are saved back in memory when the thread is suspended. The code that the thread runs is determined by the contents of a program counter within the register set. The program counter typically points to an instruction within the code segment of the application program. Memory device 116 further contains all of the logical addresses for data and instructions utilized by the process, including the stacks of the various threads. After a thread is created and prior to termination, the thread will most likely utilize system resources to gain access to process context 122. Through the process context 122, process threads can share data and communicate with one another in a simple and straightforward manner.

AIX machines support the traditional UNIX operating system (OS) which contains a number of OS commands. The AIX operating system is IBM's implementation of the UNIX operating system. UNIX is a trademark of UNIX Systems Laboratories, Inc. The NICE command and related operating system's features purport to allow an administrator the ability to favor or disfavor specific processes as they execute. The result of the NICE command sets an internal NICE value which is utilized in later priority calculations. However, the traditional NICE command's effectiveness in favoring processes is both weak and tends to diminish over time.

During standard UNIX priority calculation, as each thread runs, it accumulates ticks of central processing unit (CPU) time. The CPU time is divided in half in the priority calculation to allow more CPU time to the thread before its priority degrades. UNIX NICE adjusts the priority by adding a constant, the NICE value, to the priority calculation, where a larger value correlates to a lower priority for the thread.

Thread scheduling is an important aspect of implementing threads. Scheduling is based on a priority calculation where the NICE value adjusts the priority. The system is able to recognize that the thread gets less CPU time and itself attempts to adjust to provide more CPU time; hence there is an internal conflict of sorts which is present in the present art.

The scheduler's job is to share resources fairly among the runnable threads on a processor based on resource utilization. The only resource that the AIX scheduler deals with is CPU time. The mechanism that the scheduler utilizes to share the CPU is the priority calculation. Threads with numerically lower priorities run ahead of those with numerically higher priorities. (On a MP, affinity considerations may override this rule).

UNIX operating system (OS) has an associated system NICE value which is utilized by the kernel to determine when a thread should be scheduled to run. This value can be decreased to facilitate processes executing quickly or increased so that the processes execute slowly and thus do not interfere with other system activities.

The thread scheduler, which is part of the UNIX kernel, keeps the CPU busy by allocating it to the highest priority thread. The NICE value of a process is utilized to modify the scheduling priority of its threads. The principle factor that is taken into account when calculating the scheduling priority for a process is its recent CPU usage.

The standard UNIX priority implementation (which AIX and probably all other vendors utilize) determines a thread's dispatching priority as a simple function of its recent CPU utilization history. The NICE facility adjusts the dispatching priorities of select processes on the system by simply adjusting the priority upwards or downwards by adding a fixed amount (the NICE value). Unfortunately, the feedback mechanisms in the scheduler are simultaneously geared to allocating resources fairly to everyone. This results in the diminished effectiveness of NICE mentioned above, because the scheduler will notice the, say, decreased utilization of a thread NICEd down, and soon end up giving that thread equal treatment with all other threads contending for the processor.

Today's NICE−20 (the maximum adjustment allowed) has only a limited effect. For example, if two compute bound threads compete with one NICE'd to −20, after a short time, the default thread gets about 60% of the CPU time while the NICE'd thread gets 40%. This is a rather weak and unsatisfactory result. Although this figure can be increased with AIX schedtune, it degrades the normal behavior of the scheduler. Further, today's NICE command provides no discrimination between threads after initial advantage at the start of each second.

Many consumers, typically ones with larger systems, are desirous of a better way to allocate processor resources among the competing threads on their systems. Improvement in this area is critically important to large server business, as those consumers generally experience performance problems with mixed workloads on a single systems (i.e., in large MP systems). Consumers are no longer content to dedicate individual machines to specific subsets of their work, but demand to be able to cost effectively share the single large system.

A new priority calculation within the system scheduler is therefore desired to improve the effectiveness of the NICE command beyond merely adding the NICE value to a function.

It would therefore be desirable and advantageous to provide an improved method and system for allocation of system resources among threads with varying priorities utilizing a priority calculation which is a function of both the CPU time and a NICE value, whereby higher priority threads are provided greater system resources and lower priority thread provided less system resources. It would further be desirable to have such a system and method with a feedback mechanism allowing for greater adjustments in priority to lower priority threads so as to prevent the processing system from eliminating the effects of downward adjustments within a small number of clock cycles.

SUMMARY OF THE INVENTION

It is therefore one object of the present invention to provide an improved data processing system.

It is another object of the present invention to provide an improved method and system for scheduling threads on a data processing system.

It is yet another object of the present invention to provide a method and system for more scheduling threads on a data processing system wherein system resources are allocated based on a priority determination of a thread.

The foregoing objects are achieved as is now described. A method and system for controlling the allocation of a data processing system's resources among two or more threads is disclosed. First, a utilization history is created by mapping a thread's utilization of the system resources. Then, the priority of the thread is calculated utilizing the utilization history and a modified system value. This priority is utilized to determine the allocation of system resources to said thread.

In the preferred embodiment of the invention, the modified system value represents an internal NICE value which has been adjusted. A software algorithm is utilized to calculate the priority of the thread based on the utilization history of a thread by integrating the NICE value in its modified form (or modified system value) in the priority calculation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
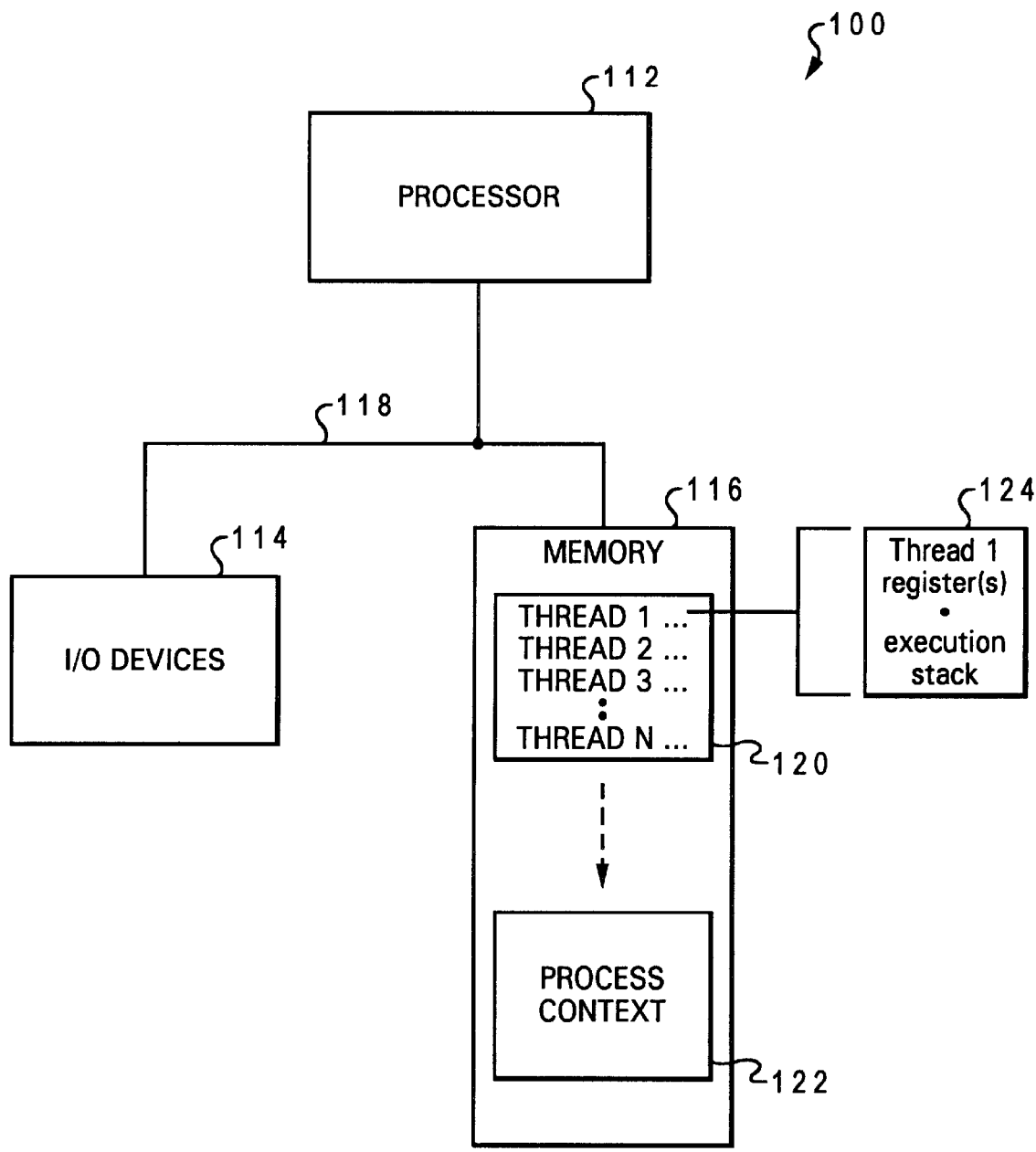
FIG. 1 is a block diagram of a conventional data processing system which is utilized to implement multithread programming.
Figure 2:
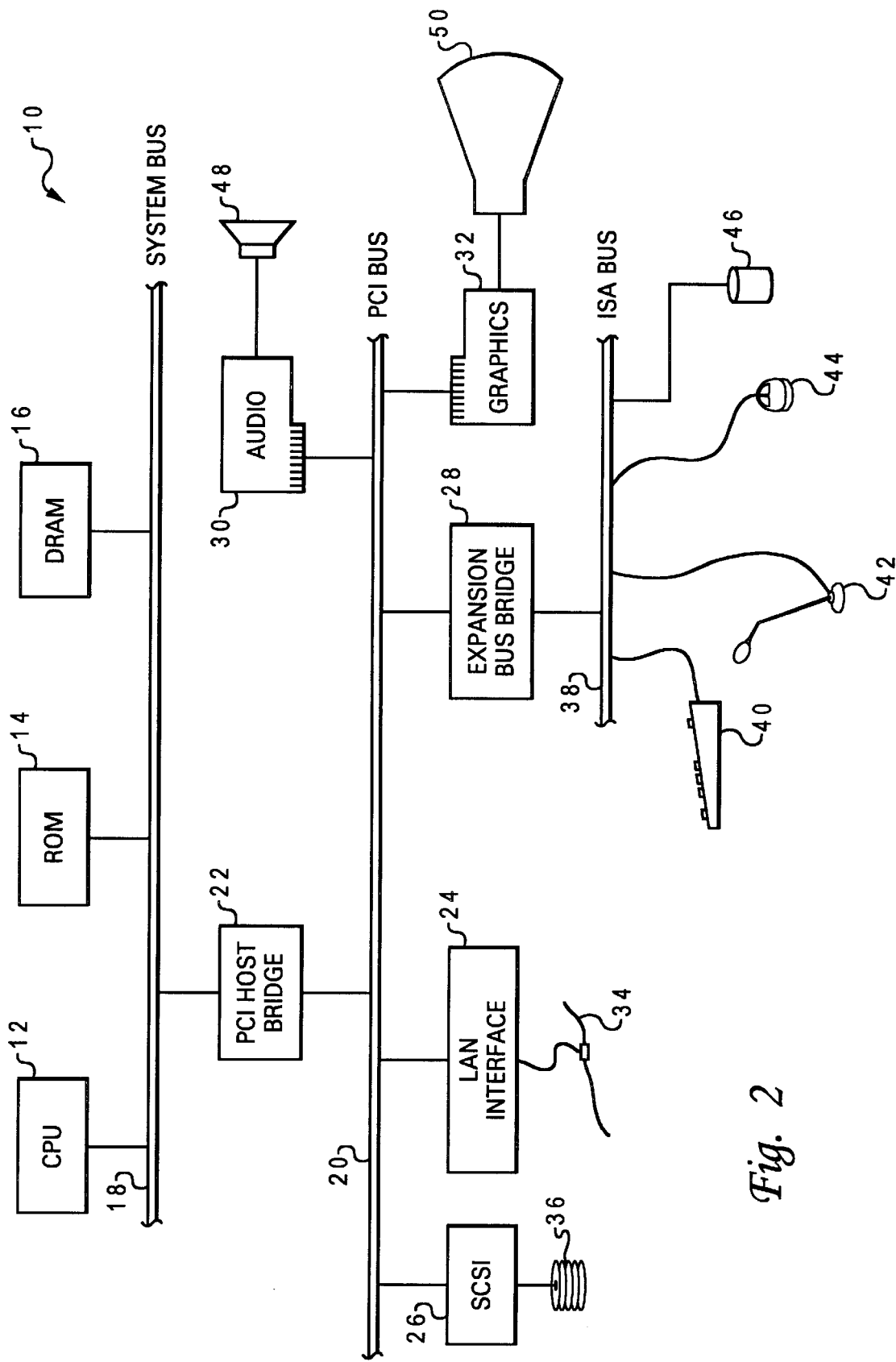
FIG. 2 is an illustration of a representative hardware environment which can be utilized in accordance with the method and system of an illustrative embodiment of the present invention.

With reference now to the figures, and in particular with reference to FIG. 2, there is depicted the basic structure of a data processing system 10 utilized in the preferred embodiment of the invention. Data processing system 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a PCI local bus 20 utilizing a PCI host bridge 22. PCI host bridge 22 provides a low latency path through which CPU 12 may access PCI devices mapped anywhere within bus memory or I/O address spaces. PCI host bridge 22 also provides a high bandwidth path to allow the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. LAN adapter 24 is utilized to connect data processing system 10 to an external computer network 34. SCSI adapter 26 is utilized to control high-speed SCSI disk drive 36. Expansion bus bridge 28 is utilized to couple an ISA expansion bus 38 to PCI local bus 20. As shown, several user input devices are connected to ISA expansion bus 38, including a keyboard 40, a microphone 42, and a graphical pointing device (mouse) 44. Other devices may also be attached to ISA expansion bus 38, such as a CD-ROM drive 46. Audio adapter 30 controls audio output to a speaker 48, and graphics adapter 32 controls visual output to a display monitor 50.

Any suitable machine-readable media may retain the method and system of an illustrative embodiment of the present invention, such as DRAM 16, ROM 14, a magnetic diskette, magnetic tape, or optical disk (the last three being located in disk and tape drives). Any suitable operating system and associated graphical user interface (e.g., Microsoft Windows) may direct CPU 12. For example, the AIX operating system and AIXwindows windowing system (i.e., graphical user interface) can direct CPU 12. The RISC System/6000 system, among others, can run the AIX operating system. Other technologies can also be utilized in conjunction with CPU 12, such as touch-screen technology or human voice control. In addition, data processing system 10 includes a control program which resides within computer storage DRAM 16. The control program contains instructions that when executed on CPU 12 carries out the operations depicted in the logic flow charts of FIG. 3 as described herein.

Those skilled in the art will appreciate that the hardware depicted in FIG. 2 may vary for specific applications. For example, other peripheral devices such as optical disk media, audio adapters, or chip programming devices, such as PAL or EPROM programming devices are well-known in the art of computer hardware, and the like may be utilized in addition to or in place of the hardware already depicted.

As a final matter, it is important that while an illustrative embodiment of the present invention has been, and will continue to be, described in the context of a fully functional data processing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

A superscalar processor paradigm is one in which a single processor is provided with multiple execution units that are capable of concurrently processing multiple instructions. Thus, in one embodiment of the invention, a superscalar processor may include an instruction cache for storing instructions, at least one fixed-point unit (FXU) for executing fixed-point instructions, a floating-point unit (FPU) for executing floating-point instructions, a load/store unit (LSU) for executing load and store instructions, a branch processing unit (BPU) for executing branch instructions, and a sequencer that fetches instructions from the instruction cache, examines each instruction individually, and opportunistically dispatches each instruction, possibly out of program order, to the appropriate execution unit for processing. In addition, a superscalar processor typically includes a limited set of architected registers that temporarily store operands and results of processing operations performed by the execution units. Under the control of the sequencer, the architected registers are renamed in order to alleviate data dependencies between instructions.

AIX provides a common operating environment for the broad range of RS/6000 systems, including new symmetric multiprocessor (SMP) systems, 64-bit systems, scalable parallel (RS/6000 SP) systems, workstations and more. Although the invention is being described with reference to a particular system, utilization of this reference is in no way meant to be limiting on the invention. Those skilled in the art understand that other system types and architecture may be utilized in the implementation of the invention.

The invention utilizes known functionalities of the UNIX NICE command and enhances it to provide more consistent thread scheduling. For the purposes of the invention, the term NICE refers to the internal mechanism or value utilized in calculating priority of threads on a CPU. Normally, processes inherit the system NICE value of their parent process. In one embodiment, at system initialization time, the system executes the initialization process with a system NICE, which is the system default priority.

The invention discloses handling priority of a thread by utilizing the NICE value. This handling is carried out by first penalizing a thread for CPU usage as a function of NICE and by allowing the NICE value to be added to the priority to differ from the value specified by the NICE command or inherited from a parent process. To complete this process, a feedback mechanism is built into the algorithm which implements the NICE functionality in the priority calculation.

In one illustrative embodiment, a NICE value of 0 establishes an extremely high priority, whereas a value of 39 indicates a very low priority. In this system type, the following commands are utilized to decrease and increase the priority:

NICE-6 mybigjob—In this example the level has been set to 20+6, or 26 which represents a lower priority; and

NICE-6 mybigjob—In this example the level has been set to 20-6, or 14 which represents a higher priority.

In the preferred embodiment of the invention a NICE value of 20 represents the normal mode of the threads. This value is utilized in a priority calculation during implementation of the invention. On this system, scheduling priorities range from 0 to 126. The priority of the thread with a default NICE of 20 and no CPU utilization will be 60. The higher the value, the lower the priority, and the lower the value, the higher the priority. On certain systems, the NICE command utilizes the numbers -20 to 20 to indicate the priorities, where 20 is the lowest and -20 is the highest.

As utilized hereinafter, the term "thread" refers to a set of one or more logically contiguous instructions within a multiscalar program that have a single entry point and multiple possible exit points. In other words, when a thread is executed, the first instruction within the thread is always executed, but there are multiple possible execution paths out of the thread. More particularly, thread in the present invention refers to threads which have their priorities calculated (not fixed) based on the CPU time (also referred to as automatic priority threads). Additionally, thread is understood to refer to any component which competes for resources of the CPU.

In one embodiment, implemented on an AIX specific system, time is measured in relatively large, discrete increments called ticks. Each tick represents 0.01 seconds. For scheduling (and accounting) purposes, a thread is "charged" for an integral number of ticks statistically. If a thread is running at the time that the tick interrupt occurs, the tick is credited completely to that thread. Recent CPU utilization is an accumulation of ticks (limited to a max of 120 ticks). In one embodiment, the number of ticks accumulated by a thread is divided by a factor of 2 every second, at which point the effect of NICE is temporarily stronger (until the lack of resource to the NICEd thread again bubbles it up in the priority scheme, subsequently giving it equal treatment again.)

Although the invention is defined with reference to tick counts in calculating a thread's CPU utilization, it is contemplated that any method of measuring CPU time to determined priority may be utilized within the invention. The invention is not limited to a tick-based priority calculation.

In the preferred embodiment, the scheduler's priority calculation is enhanced. Additionally, the externally supplied NICE value (also referred to as system value or NICE) is selectively modified to yield an internal NICE value (also referred to as modified system value or iNICE). This modification depends on the external NICE value. In the preferred embodiment, when the external NICE value is equal to zero (0), the external NICE value is utilized as the internal NICE value; however, when the external NICE value is greater than zero, then the internal NICE value is calculated as (2*external NICE value). In program logic this may be represented by:

if NICE>0, then iNICE=2*NICE;

else iNICE=NICE.

The priority calculation or priority (P) is then represented as:

$$P = 60 + \frac{\langle CPU\ utilization \rangle * \langle iNICE = 4 \rangle}{128} + iNICE$$

where "P" represents the priority. The priority value is a function of the resource allocation desired for a particular thread, as indicated by its NICE value, its prior utilization, and other factors as determined by the system. The modification of the external system value and priority calculation are completed dynamically. When a user desires to decrease a priority of a particular thread, the NICE value is increased. In the preferred embodiment, the NICE value is multiplied by two (2) although other factors may be utilized based on the level of decrease in priority desired. In this illustration, iNICE (NICE*2), when utilized as a multiplier and then added, serves to further increase the penalty with NICE. Those skilled in the art understand that in the above priority calculation a larger result corresponds to a lower priority while a smaller result corresponds to a higher priority. The priority calculation for increasing a thread's priority may also be adjusted based on the level of increase desired.

Note that in this embodiment, the actual dispatching priority of a thread is at best 60+iNICE. The NICE and renice commands are limited to a maximum NICE value of 19 (or 38 when multiplied by two).

The following illustration depicts the difference between the traditional scheduler priority calculation and that of the invention with 4 competing threads, 2 running with default behavior (i.e., not NICEd) and 2 discriminated against (i.e. NICEd "downwards"), one half the maximum amount and the other the maximum amount. In comparing the effectiveness of the prior method with that of the present invention, it is seen that with the current product priority calculation, the distribution of CPU resource to these 4 threads is 32%, 32%, 22% and 13%. This is insufficient for many large customers. Utilizing one of the preferred embodiments of the invention, the priority calculation yields a distribution of 41%, 41%, 16% and 2%. Thus the present invention provides a much more powerful tuning effect, allowing users of the system to push non-critical work truly to a background status.

In the present invention, the improved mechanism feeds the desired NICE effect directly into the scheduler's priority calculation, causing NICEd threads to consistently run at a worse (or better) rate than average. CPU utilization is halved once a second, but the priority is now biased by the NICE value. Even after the period where the NICEd (downwards) thread's priority ages to put it back in competition with normal threads, it is given resources at a diminished rate. In the preferred embodiment, this is achieved by weighing the recent CPU utilization with a function of the NICE value, effectively changing the priority penalty of each unit of CPU time a thread consumes to be greater as the NICE effect is increased.

The behavior of NICE in this invention depends on contention. Again, a single NICE'd thread which is one of N competing threads gets the following percentages of the CPU. In one embodiment of the invention, NICE is given a stronger effect wherein the maximum NICE with 2 threads improves the result so that rather than reducing from 50% to 40%, one's CPU utilization is reduced from 50% to 13%. Further, in the preferred embodiment, there is a more continuous discrimination between threads over time.

Figure 3:
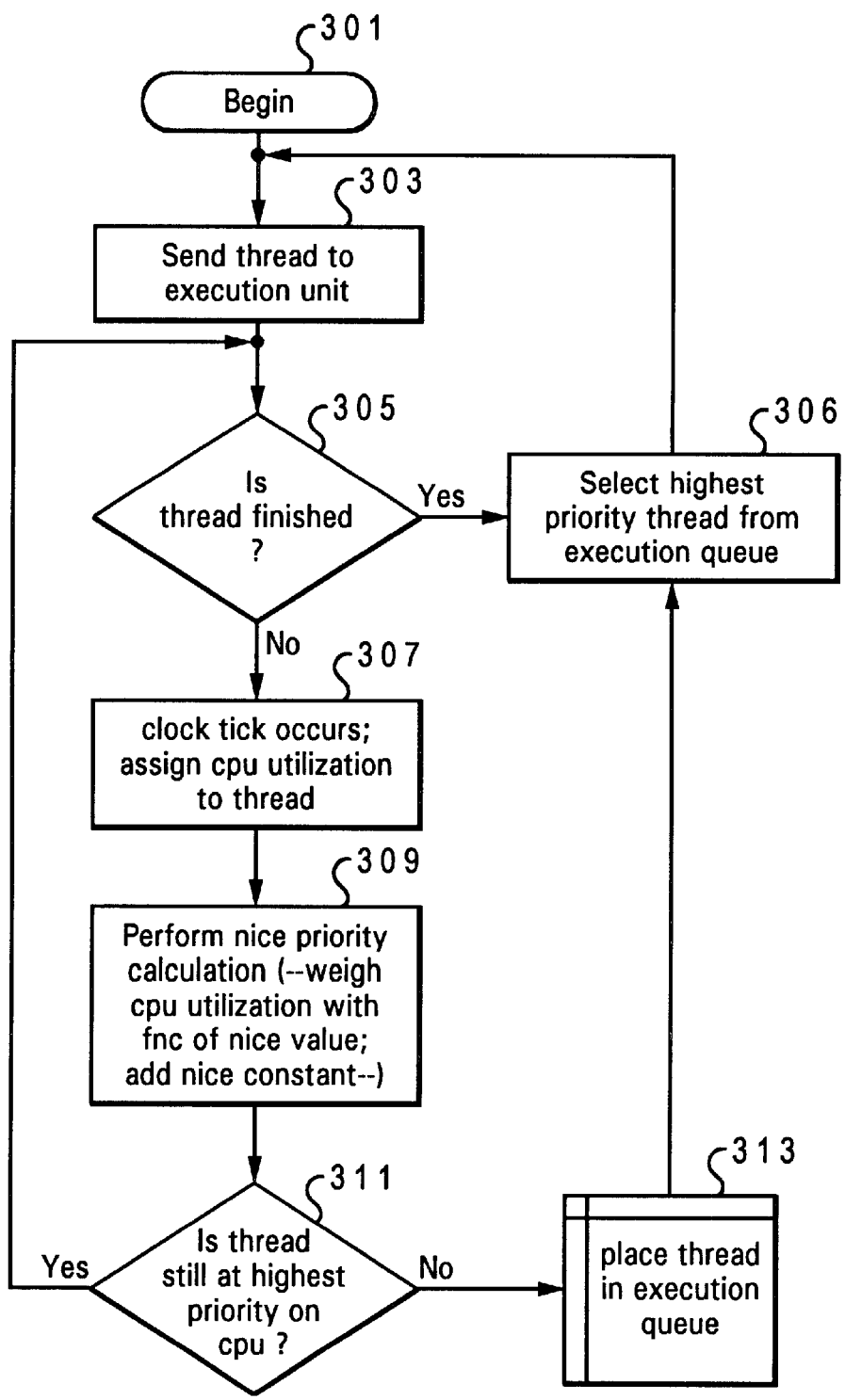
FIG. 3 is a flow chart depicting the logic flow of the method of allocating resources to a thread utilizing its utilization history in accordance with one implementation of the present invention.

FIG. 3 depicts the logic flow of the process involved in calculating a thread's priority according to one embodiment of the present invention. The process begins (step 301) when the CPU selects the highest priority thread from the execution queue (step 306). From here, the thread is sent to the execution unit of the CPU (step 303). In this illustrative embodiment, it is assumed that at least two competing threads exist within the execution unit and are chosen based on the priority as calculated for each thread. A thread may be in various stages of completion when sent to the execution unit, thus a check is made to determine if the thread has finished executing (step 305). If it has, then the process returns to select the highest priority thread from the execution queue (step 306) coupled to the execution unit. If, however, the thread still has to be executed it runs in the execution unit. As the thread executes, clock ticks occur indicating that it is utilizing CPU time or system resources, and the thread is assigned the CPU utilization (step 307). In the illustrative embodiment, a clock tick is assigned to a thread running at the time the tick occurs. Utilization history is stored in a memory area of the data processing system described above in FIG. 2. After each clock tick, (or at a predetermined time) the system instantiates a priority calculation on the thread in the execution unit. The enhanced priority calculation of the invention involves weighting a CPU utilization formula with a function of the NICE value to determine a priority of the individual threads (step 309). This process is described above in detail. A check is made to determine if the thread currently in the execution unit still has the highest priority (step 311). If the thread has the highest priority, it is allowed to continue executing until it finishes. If however, the thread no longer has the highest priority, it is placed in the execution queue (step 313). The process then selects the thread with the highest priority to send to the execution unit (step 306). The priority calculation includes a timing mechanism utilized both for instantiating the priority check and also for determining the length of time elapsed since a thread has been prioritized.

At a predetermined time interval during the process described in FIG. 3, the CPU utilization histories of all the active threads on the system are halved. In the preferred embodiment, this halving occurs once every second. After each halving, the priority calculation calculates the priority of each thread in the system according to the formula described above.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although the flow diagram discusses a thread returning to the execution queue when it is no longer at the highest priority, it is contemplated that a thread may be forced back into the queue based on other factors inherent in the utilization history and priority calculation. It is further understood that any number of threads may be competing simultaneously for system resources and that each has a unique priority calculation which places it on varying levels in the execution queue. Further the invention can be implemented in a multiprocessor system. In such a system, it is contemplated that the thread with the highest priority is running on one of the processors. Finally, although the invention references timed resources, it is contemplated that the invention may be utilized with other system resources which are quantifiable and measurable by the CPU. It is therefore contemplated that such modifications can be made without departing from the spirit or scope of the present invention as defined in the appended claims.

What is claimed is:

1. A method for controlling the allocation of a data processing system's resources among two or more components competing for said resources, said method comprising the steps of:

adjusting a system value that is utilized as an offset for calculating a priority of said components when scheduling access to a specific system resource to yield a modified system value, wherein said modified system value accentuates the effect of said system value so that a resulting priority penalty is greater as the system value increases and said priority penalty is smaller as said system value decreases;

calculating the priority of said components utilizing said modified system value within a priority calculation, wherein said calculated priority is utilized to schedule access of said components to said specific system resource and is different from a priority calculated with said system value; and scheduling said components according to said priority calculated utilizing said modified system value.

2. The method of claim 1, said adjusting step further including the step of selectively increasing said system value to obtain said modified system value, wherein when said component is desired to have a lower priority, said system value is dynamically increased.

3. The method of claim 1, wherein said component is a thread and said calculating step further comprises the steps of:

tracking a thread's utilization of said resources to create a utilization history utilized to determine a correlated utilization value; and calculating said priority of said thread utilizing said utilization value and said modified system value.

4. The method of claim 3, wherein said tracking step includes the step of monitoring a time period when said thread utilizes resources of a CPU of said data processing system.

5. The method of claim 3, wherein said data processing system contains a UNIX operating system and said system value is a NICE value, wherein further:

said tracking step includes the steps of monitoring said utilization value for a plurality of said threads; and said calculating step includes the steps of:

assigning specific priorities to each of said plurality of said threads based on said utilization value and said modified system value; and comparing said specific priorities of each of said plurality of threads to determine an effective priority of each of said threads.

6. The method of claim 5, wherein said calculating step yields a different priority based on said modified system value, wherein said calculating step further includes the step of changing a priority penalty for a unit of CPU time that a thread consumes, so that said penalty is greater as a NICE effect is increased and said penalty is smaller as said NICE effect is decreased, said priority penalty corresponding to said NICE value.

7. The method of claim 6, wherein said changing step includes the step of calculating said priority utilizing said modified system value within a priority equation, wherein said modified system value is dependent on a plurality of factors including:

level of priority desired for each of said plurality of threads;

length of time for sustaining a higher or lower priority once assigned;

utilization history of a particular thread; and data processing system's ability to efficiently handle multiple threads.

8. The method of claim 7, wherein when a thread is desired to be of low priority, said calculating step includes the step of increasing said NICE value to yield said modified system value.

9. The method of claim 8, wherein said increasing step includes the step of multiplying said NICE value by a factor greater than 1.

10. A system for controlling the allocation of a data processing system's resources among two or more components competing for said resources, said system comprising:

means for adjusting a system value that is utilized as an offset for calculating a priority of said components when scheduling access to a specific system resource to yield a modified system value, wherein said modified system value accentuates the effect of said system value so that a resulting priority penalty is greater as the system value increases and said priority penalty is smaller as said system value decreases;

means for calculating the priority of said components utilizing said modified system value within a priority calculation, wherein said calculated priority is utilized to schedule access of said components to said specific system resource and is different from a priority calculated with said system value; and means for scheduling said components according to said priority calculated utilizing said modified system value.

11. The system of claim 10, said adjusting means further including means for selectively increasing said system value to obtain said modified system values wherein when said component is desired to have a lower priority, said system value is dynamically increased.

12. The system of claim 10, wherein said component is a thread and said calculating means further comprises:

means for tracking a thread's utilization of said resources to create a utilization history utilized to determine a correlated utilization value; and means for calculating a priority of said thread utilizing said utilization value and said modified system value.

13. The system of claim 12, wherein said data processing system contains a UNIX operating system and said system value is a NICE value wherein further:

said tracking means includes means for monitoring said utilization value for a plurality of said threads; and said calculating means includes means for:

assigning specific priorities to each of said plurality of said threads based on said utilization value and said modified NICE value; and comparing said specific priorities of each of said plurality of threads to determine an effective priority of each of said threads.

14. The system of claim 13, wherein said calculating means yields a different priority based on said modified system value, wherein said calculating step further includes means for changing a priority penalty for a unit of CPU time that a thread consumes, so that said penalty is greater as a NICE effect is increased and said penalty is smaller as said NICE effect is decreased.

15. The system of claim 14, wherein said changing means includes means for calculating said priority utilizing said modified system value within a priority equation, wherein said modified system value is dependent on a plurality of factors including:

level of priority desired for each of said plurality of threads;

utilization history of a particular thread; and the data processing system's ability to efficiently handle multiple threads.

16. The system of claim 15, wherein when a thread is desired to be of low priority, said calculating means further includes means for multiplying said NICE value by a factor greater than 1 to yield said modified system value.

17. A computer program product for controlling the allocation of a data processing system's resources among two or more components competing for said resources, said program product comprising:

a computer readable medium; and program instructions on said computer readable medium for:

adjusting a system value that is utilized as an offset for calculating a priority of said components when scheduling access to a specific system resource to yield a modified system value, wherein said modified system value accentuates the effect of said system value so that a resulting priority penalty is greater as the system value increases and said priority penalty is smaller as said system value decreases;

calculating the priority of said components utilizing said modified system value within a priority calculation, wherein said calculated priority is utilized to schedule access of said components to said specific system resource and is different from a priority calculated with said system value; and scheduling said components according to said priority calculated utilizing said modified system value.

18. The computer program product of claim 17, said program instructions for said adjusting step further including instructions for selectively increasing said system value to obtain said modified system value wherein when said component is desired to have a lower priority, said system value is dynamically increased.

19. The computer program product of claim 17, wherein said component is a thread, and said program instructions for said calculating step further includes instructions for:

tracking a thread's utilization of said resources to create a utilization history utilized to determine a correlated utilization value; and calculating a priority of said thread utilizing said utilization value and a modified system value.

20. The computer program product of claim 19, wherein said program instructions for said creating step includes program instructions for monitoring a time period when said thread utilizes resources of a CPU of said data processing system.

21. The computer program product of claim 19, wherein said program instructions are run on a data processing system containing a UNIX operating system and said system value is a NICE value, wherein further:

said program instructions for said tracking step includes program instructions for monitoring said utilization value for a plurality of said threads; and said program instructions for said calculating step includes program instructions for:

assigning specific priorities to each of said plurality of said threads based on said utilization value and said modified NICE value; and comparing said specific priorities of each of said plurality of threads to determine an effective priority of each of said threads.

22. The computer program product of claim 21, wherein said program instructions for said calculating step further includes program instructions for changing a priority penalty for a unit of CPU time that a thread consumes, wherein said penalty is greater as a NICE effect is increased and said penalty is smaller as said NICE effect is decreased.

23. The computer program product of claim 22, wherein said program instructions for said changing step includes program instructions for calculating said priority utilizing said NICE value within a priority equation, wherein said modified system value is dependent on a plurality of factors including:

level of priority desired for each of said plurality of threads;

utilization history of a particular thread; and the data processing system's ability to efficiently handle multiple threads.

24. The computer program product of claim 23, wherein when a thread is desired to be of low priority, said program instructions for said calculating step further includes program instructions for multiplying said NICE value by a factor greater than 1 to yield said modified system value.

* * * * *